UNITED STATES PATENT OFFICE.

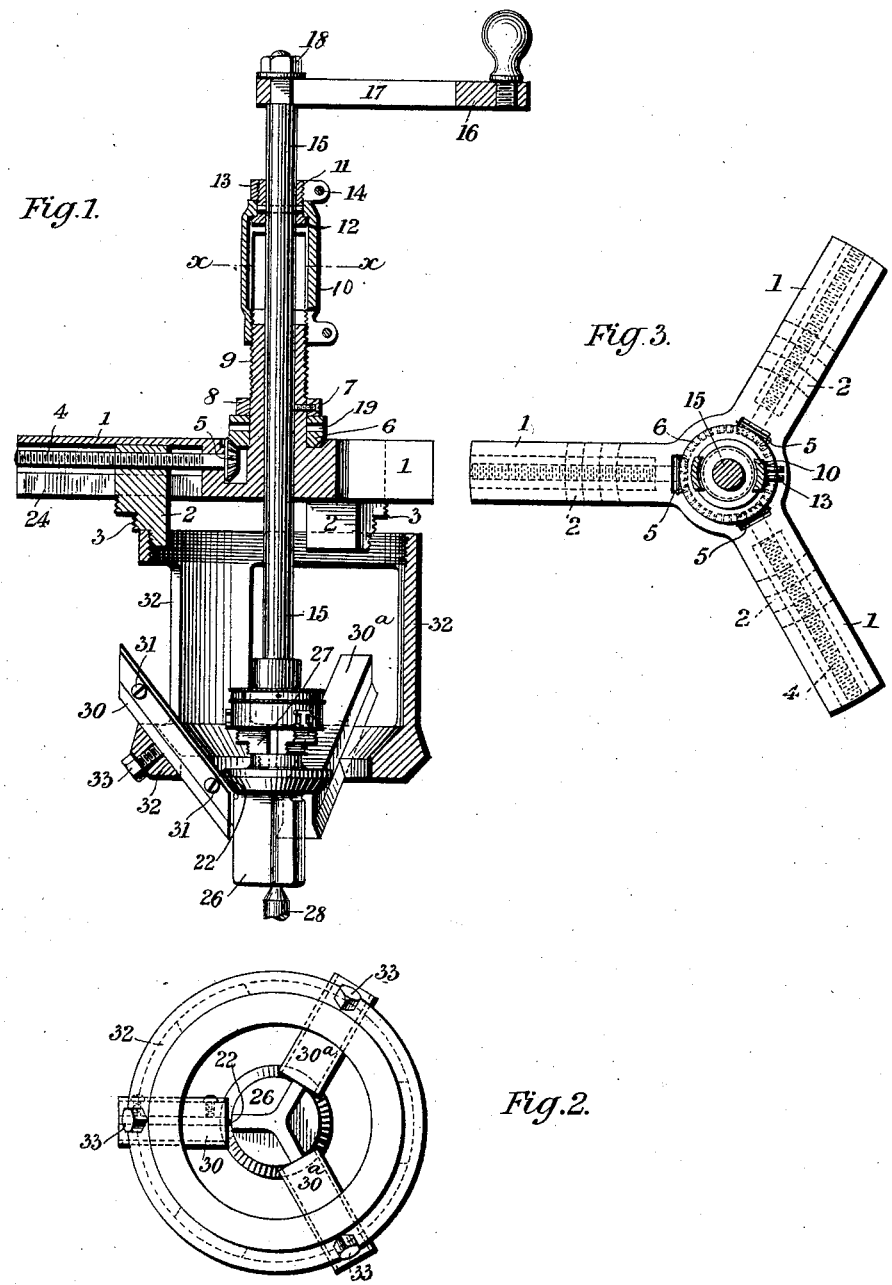

PERCIVAL JOHN PURDY, OF MANCHESTER, ENGLAND.

APPARATUS FOR RESEATING VALVES, BORING CYLINDERS, &c.

SPECIFICATION forming part of Letters Patent No. 605,810, dated June 14, 1898.

Application filed April 29, 1898. Serial No. 679,224. (No model.)

*To all whom it may concern:*

Be it known that I, PERCIVAL JOHN PURDY, a subject of the Queen of Great Britain, residing at Manchester, England, have invented certain new and useful Improvements in Apparatus for Reseating Valves, Boring Cylinders, and Like Purposes, of which the following is a specification.

At the present time several forms of apparatus are in the market adapted more or less successfully to reseat valves *in situ*. These forms of apparatus, generally speaking, comprise a chuck adapted to engage with the interior of the valve-casing, a central spindle carrying a suitably-shaped cutting or facing tool, and means for feeding and rotating such tool. For cutting the valve-disk the apparatus most commonly used consists of a casing adapted to hold the valve-disk, a fixed cutting-tool carried by the casing, the spindle of the valve being held by a chuck and the disk revolved against the cutting-face.

My invention relates to improvements in apparatus for carrying out the above objects of reseating valves and facing disks, all as hereinafter more fully set forth, reference being made to the accompanying drawings, in which—

Figure 1 is an elevation, partly in section, showing the apparatus as arranged for facing a stemmed or winged valve-disk. Fig. 2 is a face view looking from beneath; and Fig. 3 is a plan view on line *x x*, Fig. 1.

In all the views like numerals are used to designate like parts of the apparatus.

To facilitate an easy comprehension of my invention, I will explain it first with reference to its use for the purpose of boring or reseating a port or stationary part of a valve or cylinder. In this form it consists of arms 1, having dovetail or like grooves, in which slide stepped jaws 2, having screwed or other suitably-shaped faces 3, the jaws being traversed in the arms by the threaded screws 4, so that they will be equally moved in or out from the center to engage with the interior of the valve-casing, port, cylinder, or the frame for holding the disk against which the faces 3 are adapted to press. The screws have bevel-gears 5, which engage with a gear 6, capable of rotation on a stem 9, which carries arms 1, the gear being retained in position by a collar 8 or in any suitable way. The collar 8 may be secured to the stem 9 by a screw 7 when desired. The stem 9 is threaded and carries an open-sided nut 10, through which and the stem passes a spindle 15, which is to carry the cutting-tool. On this spindle is a split and screwed collar 11, having a flange 12, which the upper part of the nut embraces, and which collar is gripped by a split and screwed ring 13, a screw 14 being employed for bringing two ears or lugs on same together. The spindle has a handle 16, slotted at 17 and secured by a nut 18, so that it may be moved to and fro to alter the length of the handle according to the position in which the apparatus is situated or being used. The gear 6 may have a square upper part for a spanner or may have pin-holes 19 for a rod or tool, and the spindle is adapted to carry tools of various shapes, according to the work it is required to do.

The apparatus when in use is adjusted in the opening of the valve or port by rotating the gear 6, which fixes the jaws 2 in the opening, so that the spindle is centrally held while it is rotated by the handle 16, the tool cutting the face or side of the valve-seat or the like. When it requires to be fed downward to the work, the nut 10 is turned by hand or by a tool, which draws down collar 11, and consequently the spindle 15.

In Fig. 1 the valve-disk 26 is shown as held in a suitable chuck or grip, such as 27, and if of large size it may be further supported by a centering-pin, as 28. The cutter is adjustable, the form I prefer being that shown, in which the cutting edge 22 is held in a groove in a bar 30 by means of set-screws 31, the bar being held in a frame 32 in dovetailed grooves by means of a set-screw 33, so that it is capable of vertical or angular adjustment to suit the size of valve being refaced, and the frame 32 itself may be suitably held while the work is in progress.

To support the valve during cutting, bars 30ª 30ª, adjustable in the same way as the bar 30, may be employed.

The frame 32 is an open shell having a cross frame or head, the opening at the rear end of same being screwed to enable it to hold the jaws 2, the spindle 15 of which carries the chuck 27.

When the apparatus is to be used for reseating the face of a valve, the frame 32 and chuck 27 are removed from the jaws 2 and spindle 15, and the jaws are caused to engage with the valve-casing, and an ordinary cutter or grinder is substituted for the chuck, the rotation of the spindle and its feed remaining the same as when the disk is being faced.

What I claim is—

1. In apparatus for reseating or facing valve seats and disks, the combination of stepped gripping-jaws, screw-threaded arms provided with bevel gear-wheels carrying said jaws, a hollow stem, a spindle in said stem, means for rotating and feeding said spindle, a nut provided with a bevel-gear mounted on said stem and means for holding the nut in position against the thrust of the bevel-gears, substantially as described.

2. In an apparatus for reseating or facing valve-seats, the combination of a casing provided with adjustable cutting-tools, stepped gripping-jaws, means for moving said jaws inwardly or outwardly in unison, a screw-threaded hollow stem, a spindle passing through said stem, means for feeding said spindle in said stem, consisting of an open-sided nut mounted on said stem, a collar mounted on said spindle and means for securing said collar to said spindle, and an adjustable crank-handle for rotating said spindle, substantially as described.

In testimony whereof I have hereunto set my hand in the presence of two subscribing witnesses.

PERCIVAL JOHN PURDY.

Witnesses:
ALLEN PARRY JONES,
FRED C. HARRIS.